United States Patent [19]
Nayebi et al.

[11] Patent Number: 5,864,371
[45] Date of Patent: Jan. 26, 1999

[54] LUMINANCE SIGNAL GENERATION CIRCUIT WITH SINGLE CLAMP IN CLOSED LOOP CONFIGURATION AND HORIZONTAL SYNCHRONIZATION PULSE GENERATION

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 853,047

[22] Filed: May 8, 1997

[51] Int. Cl.[6] .................................................... H04N 9/72
[52] U.S. Cl. ............................................. 348/692; 348/695
[58] Field of Search ....................................... 348/691, 692, 348/697, 695, 684, 685, 659, 521, 528, 531

[56] References Cited

U.S. PATENT DOCUMENTS

| | | | |
|---|---|---|---|
| 4,295,161 | 10/1981 | Hettiger | 348/692 |
| 4,393,412 | 7/1983 | Tatami | 358/318 |
| 4,473,839 | 9/1984 | Noda | 348/692 |
| 4,636,836 | 1/1987 | Steckler et al. | 358/19 |
| 4,667,242 | 5/1987 | Hagino | 348/684 |
| 4,698,601 | 10/1987 | Aizawa | 331/1 A |
| 4,709,258 | 11/1987 | Salzer | 358/27 |
| 4,717,953 | 1/1988 | Chang et al. | 348/692 |
| 4,729,013 | 3/1988 | Tatami et al. | 358/19 |
| 4,802,032 | 1/1989 | Tatsuzawa et al. | 360/77.13 |
| 4,866,511 | 9/1989 | Belmares-Sarabia et al. | 348/631 |
| 4,891,608 | 1/1990 | Ikeda | 331/20 |
| 4,930,004 | 5/1990 | Yamamoto et al. | 348/691 |
| 4,965,669 | 10/1990 | Canfield et al. | 348/695 |
| 5,124,671 | 6/1992 | Srivastava | 331/10 |
| 5,179,450 | 1/1993 | Ando et al. | 358/312 |
| 5,182,497 | 1/1993 | Yamate et al. | 348/695 |
| 5,245,430 | 9/1993 | Nishimura | 358/149 |
| 5,256,989 | 10/1993 | Parker et al. | 331/1 A |
| 5,272,522 | 12/1993 | Lagoni | 348/692 |
| 5,278,520 | 1/1994 | Parker et al. | 331/1 A |
| 5,304,953 | 4/1994 | Heim et al. | 331/1 A |
| 5,339,114 | 8/1994 | Lagoni et al. | 348/695 |
| 5,374,900 | 12/1994 | Masumoto | 331/1 A |
| 5,448,308 | 9/1995 | Walby et al. | 348/697 |
| 5,534,821 | 7/1996 | Akiyama et al. | 331/8 |
| 5,638,137 | 6/1997 | Thomas | 348/689 |

*Primary Examiner*—Victor R. Kostak
*Attorney, Agent, or Firm*—Haverstock & Owens LLP

[57] ABSTRACT

A luminance signal generation circuit with single clamp and horizontal synchronization pulse generation circuit generates a separate luminance video signal Y, representing RGB input signals, and having a horizontal synchronization pulse. During a burst period, the single clamping circuit compares the separate luminance signal Y to a reference signal. A difference signal, representing the difference between the separate luminance signal Y and the reference signal, is used to adjust a blanking level of the RGB input signals until the blanking level of the separate luminance signal Y is equal to the reference signal. During the non-burst periods, the single clamping circuit is disabled and a Y-matrix circuit combines the RGB input signals into the separate luminance signal Y. A horizontal synchronization pulse generation circuit generates a horizontal synchronization pulse to be added to the clamped separate luminance signal Y. During the horizontal synchronization period, a current is switched through a path resistor and used to generate the voltage level of the horizontal synchronization pulse. The voltage drop across the path resistor during the horizontal synchronization period is applied directly to the output video signal thereby generating a horizontal synchronization pulse. The current switched through the path resistor is generated by a voltage drop across a current resistor. The ratio of the path resistor to the current resistor is matched, allowing the required signal accuracy to be achieved in the voltage drop across the path resistor and generating the appropriate voltage drop across the path resistor according to the current flowing through the current resistor.

36 Claims, 11 Drawing Sheets

Fig. 5A VIDEO IN

Fig. 5B SYNC

Fig. 5C $\overline{SYNC}$

Fig. 5D VIDEO OUT

LUMINANCE SIGNAL GENERATION CIRCUIT WITH SINGLE CLAMP IN CLOSED LOOP CONFIGURATION AND HORIZONTAL SYNCHRONIZATION PULSE GENERATION

FIELD OF THE INVENTION

The present invention relates to the field of encoding a video signal. More particularly, the present invention relates to the field of clamping an RGB video signal and a resulting separate luminance or Y signal and generating a horizontal synchronization pulse to be added to the resulting separate luminance signal.

BACKGROUND OF THE INVENTION

A composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase locked loop to synchronize the system for displaying the next horizontal line of video information. The burst signal is used to synchronize the phase of the sampling pulses with the phase of the color subcarrier signal. The burst signal has a burst signal frequency equal to 3.58 MHz, which is the frequency of the chrominance subcarrier $f_{sc}$. The video information signal then comprises the chrominance subcarrier having different phases amplitude-modulated with chrominance information. The composite color video signal includes both luminance and chrominance information.

A video encoder circuit receives RGB video signals from a video source and encodes a composite video signal representing the RGB signals for transmission to other systems. The RGB video signals are typically encoded first into separate luminance Y and chrominance C signals. The separate luminance Y and chrominance C signals are then combined into the composite video signal. Different types of televisions, monitors and displays will accept the separate chrominance C and luminance Y video signals or the composite video signal CV. Accordingly, most video encoders provide the separate chrominance C and luminance Y video signals and the composite video signal CV, allowing the system designer the flexibility to use either the separate chrominance C and luminance Y video signals or the composite video signal CV.

Within the video signals, the values of the components are determined by their relative amplitude with respect to the blank or pedestal level. It is therefore essential that the blank or pedestal level is maintained at a known level so that the value of the components can be readily determined by the system. The blank level of a video signal is typically clamped to a known DC level allowing the values of the components within the signal to be determined by determining their amplitude with respect to the known DC level. The blank level of the separate chrominance C and luminance Y video signals must also be clamped to a known blank or pedestal level in order to determine the true values of their components.

A video encoder circuit of the prior art with four clamping circuits is illustrated in FIG. 1. The video encoder circuit receives an RGB signal and generates a composite video signal CV, a separate luminance video signal Y and a separate chrominance video signal C from the RGB signal. The RGB signal includes separate Red, Green and Blue signals which are combined within the encoder 10, into the separate luminance signal Y, by a Y-matrix circuit 12, and into the separate chrominance signal C, by the chrominance generation circuit 26. The separate luminance signal Y and the separate chrominance signal C are then combined by the composite video generation circuit 28 into the composite video signal CV. The Y-matrix circuit 12 mathematically multiplies each of the Red, Green and Blue signals by an appropriate weighting factor to obtain weighted signals, which are combined together to form the separate luminance signal Y. The equation implemented by the Y-matrix circuit is:

$$Y = 0.30*R + 0.59*G + 0.11*B \qquad (1)$$

Accordingly, in order to derive the separate luminance signal Y, the Red, Green and Blue input signals are combined according to equation (1), with the Red, Green and Blue signals comprising unequal components of the separate luminance signal Y.

When bringing electrical signals into a system from an outside system, it is typically necessary to shift the signals into an appropriate voltage range to compensate for any difference in signal voltage resulting from a difference in absolute ground potential between the two systems. This operation is performed by a clamping circuit which shifts the range of the signals into the range expected by the receiving system. For a video signal, as described above, such a clamping circuit will clamp the blank level of the signal to a known level, in order that the components of the signal can be readily determined.

As illustrated in FIG. 1, the clamping circuits 14, 16 and 18 are used to adjust the Red, Green and Blue input signals received from an outside system, to an appropriate level expected by the Y-matrix circuit 12. The clamping circuits 14, 16 and 18 shift the blank levels of the Red, Green and Blue input signals, respectively, to a known DC level.

The Y-matrix circuit 12 combines the clamped Red, Green and Blue input signals, in a weighted fashion according to equation (1), to form the separate luminance signal Y which is provided from the output of the Y-matrix circuit 12. After a delay 22, a fourth clamping circuit 20 is then used to shift the DC voltage level of the separate luminance signal Y provided from the Y-matrix circuit 12, before it is output from the video encoder circuit 10. The delay 22 is built into the separate luminance video signal Y path in order to compensate for the chrominance generation circuit 26 which takes a longer period of time to generate the separate chrominance signal C. In order to provide the separate chrominance signal C and the separate luminance signal Y to the composite video signal generation circuit 28 simultaneously, the delay 22 is incorporated after the separate luminance signal Y is generated by the Y-matrix circuit 12. After the delay 22 and the clamping circuit 20, the separate luminance signal Y is provided to a horizontal synchronization pulse generation circuit 24 for adding a horizontal synchronization pulse to the separate luminance signal Y, during the horizontal synchronization period. From the horizontal synchronization pulse generation circuit 24, the separate luminance signal Y, with horizontal synchronization pulse, is then provided as an output of the video encoder circuit and to the composite video signal generation circuit 28.

The clamping circuits 14, 16, 18 and 20 each require extra circuitry to be added to the video encoder circuit 10. Each clamping circuit typically includes a large capacitor which is external to the video encoder circuit 10. Not only do these large capacitors take up valuable space within the system, but when the video encoder circuit 10 is implemented within an integrated circuit, a pin for each of these external capacitors is required, thus increasing the necessary size of the video encoder circuit 10.

In order to drive state-of-the-art high performance monitors the clamping circuits must also be capable of passing signals at speeds of at least 33 MHz. Conventional approaches utilize a differential amplifier with high speed npn and pnp transistors to replicate the video signal for driving such high performance monitors. As is well known among those skilled in the art, such high-speed pnp transistors are expensive to include within a system or integrated circuit. Accordingly, such a conventional approach requires a relatively expensive process to manufacture and is still unable to meet the speed requirements for driving high performance monitors. What is needed is a clamping circuit which requires less external components, takes up less space and provides higher performance characteristics than conventional designs without using high speed pnp transistors.

In order to comply with the National Television Standards Committee (NTSC) video specifications, horizontal synchronizing pulses must be embedded in the video stream in order for the receiving systems to operate properly. These horizontal synchronizing pulses must also be set to exact levels in order to meet the NTSC specifications. A horizontal synchronization pulse is included within each horizontal period of an encoded video signal in order to allow the receiving system to synchronize to each horizontal line of video information within the encoded video signal.

The horizontal synchronization pulse is generated by the horizontal synchronization pulse generation circuit 24 and added to the separate luminance signal Y before it is provided to the composite video generation circuit 28. Typical prior art video encoder circuits generate exact horizontal synchronization pulse levels by first clamping the encoded video signal to a precise reference voltage level. Accordingly, during the time period when the horizontal synchronization pulse is to be added, the voltage of the encoded separate luminance video signal Y is exactly known by the system. A switching circuit, within the horizontal synchronization pulse generation circuit 24, is then used to switch to a steady, precise horizontal synchronization voltage level, during the horizontal synchronization time period. At the end of the horizontal synchronization time period, the switching circuit switches away from the steady, precise horizontal synchronization voltage level and back to the video signal. Accordingly, the resulting encoded video signal includes a horizontal synchronization pulse during the horizontal synchronization time period and the video signal during all other periods.

When generating horizontal synchronization pulses, a video encoder circuit, as described above, requires the generation of two precise voltage reference levels for clamping the encoded video signal to the precise reference voltage level and for generating the horizontal synchronization pulse at the horizontal synchronization voltage level. Because of the difficulty associated with generating such precise voltage levels within an integrated circuit, external components are required to generate the necessary voltage levels. The clamping circuit 20 is required to clamp the encoded video signal to the precise reference voltage level. A switching mechanism is also required to switch between the encoded video signal and the horizontal synchronization voltage level at the beginning of the horizontal synchronization pulse and to then switch back from the horizontal synchronization voltage level to the encoded video signal at the completion of the horizontal synchronization pulse. What is needed is a horizontal synchronization pulse generating circuit within a video encoder which does not require the clamping and switching circuitry and the generation of the precision voltage levels required by the video encoder circuits of the prior art.

SUMMARY OF THE INVENTION

A luminance signal generation circuit with single clamp and horizontal synchronization pulse generation circuit generates a separate luminance video signal Y, representing RGB input signals, and having a horizontal synchronization pulse. During a burst period, the single clamping circuit compares the separate luminance signal Y to a reference signal. A difference signal, representing the difference between the separate luminance signal Y and the reference signal, is used to adjust a blanking level of the RGB input signals until the blanking level of the separate luminance signal Y is equal to the reference signal. During the non-burst periods, the single clamping circuit is disabled and a Y-matrix circuit combines the RGB input signals into the separate luminance signal Y. A horizontal synchronization pulse generation circuit generates a horizontal synchronization pulse to be added to the clamped separate luminance signal Y. During the horizontal synchronization period, a current is switched through a path resistor and used to generate the voltage level of the horizontal synchronization pulse. The voltage drop across the path resistor during the horizontal synchronization period is applied directly to the output video signal thereby generating a horizontal synchronization pulse. The current switched through the path resistor is generated by a voltage drop across a current resistor. The ratio of the path resistor to the current resistor is matched, allowing the required signal accuracy to be achieved in the voltage drop across the path resistor and generating the appropriate voltage drop across the path resistor according to the current flowing through the current resistor.

BRIEF DESCRIPTION OF THE DRAWINGS

FIG. 5A illustrates a waveform representing the input video signal Video In.

FIG. 5B illustrates a waveform representing the synchronization input signal Sync.

FIG. 5C illustrates a waveform representing the synchronization input signal $\overline{\text{Sync}}$.

FIG. 5D illustrates a waveform representing the output video signal Video Out generated by the horizontal synchronization pulse generation circuit of the present invention.

DETAILED DESCRIPTION OF THE PREFERRED EMBODIMENT

Figure 1:
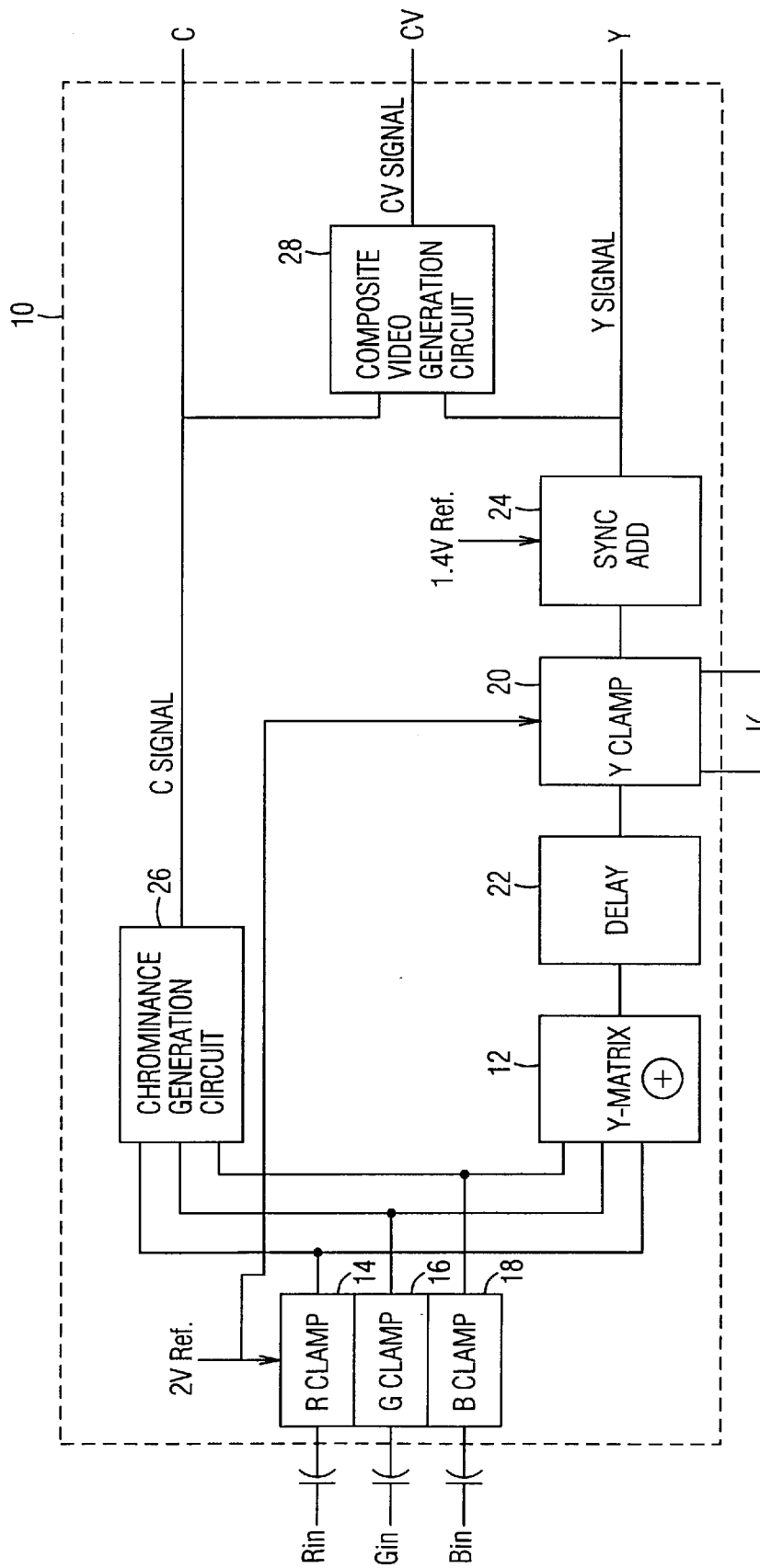
FIG. 1 illustrates a video encoder circuit of the prior art including a chrominance signal generation path and a luminance signal generation path with four clamping circuits, a delay and a horizontal synchronization pulse generation circuit.

A luminance signal generation circuit with a single clamp and horizontal synchronizing pulse generation circuit generates the separate luminance video signal Y, representing RGB input signals, and having a horizontal synchronization pulse. The single clamping circuit clamps the blanking level of the RGB input signals and the resulting separate luminance signal Y, output from a Y-matrix circuit, to a known level during a burst period. The separate luminance signal Y output from the Y-matrix circuit is provided as a feedback signal to the single clamping circuit. The single clamping circuit is enabled only during the burst period. The blanking level of the separate luminance signal Y is then compared, during the burst period, to a constant voltage reference level. Any difference between the separate luminance signal Y and the constant voltage reference level is compensated for by the single clamping circuit at the input receiving circuits, which receive the RGB input signals, and then provide the RGB input signals to the Y-matrix circuit.

Within a video signal, including the RGB input signals and the separate luminance signal Y, each period includes a horizontal synchronization phase, a burst phase and a video information phase. The values carried within the video signals are determined by determining the difference in their amplitude and the blank level of the signal. The luminance signal generation circuit of the present invention sets the blank level of the separate luminance signal Y, formed from the RGB input signals, to a known level so that the generated separate luminance signal Y accurately represents the information carried by the RGB input signals. The blank level of the RGB input signals is also set to the known level by the single clamping circuit. In the preferred embodiment of the present invention, the blank level is set to a level equal to two volts.

A burst flag signal representing the presence of the burst signal and thereby the burst phase of the video signal to be encoded, is provided to the luminance signal generation circuit with single clamping circuit. During the period when the burst flag signal is active and the burst signal is present within the video signal, the single clamping circuit clamps the blank level of the separate luminance signal Y to the appropriate level, by clamping the RGB input signals to appropriate levels. The clamping circuit includes a differential amplifier which is only enabled during the burst period and when enabled, compares the DC level of the separate luminance signal Y to a constant voltage reference signal. The difference between the DC level of the separate luminance signal Y and the constant voltage reference signal is output from the differential amplifier and provided to the RGB input circuits for adjusting the blanking level of the RGB input signals and ultimately of the resulting separate luminance signal Y to the appropriate blanking level. Once the blank level of the separate luminance signal Y is clamped to the appropriate level it will remain there throughout the non-burst period of the separate luminance signal Y.

The horizontal synchronization pulse generation circuit within the luminance signal generation circuit of the present invention generates a horizontal synchronization pulse which is added to the separate luminance video signal. The horizontal synchronization pulse generation circuit receives the separate luminance video signal from a Y-matrix circuit, preferably through a buffering circuit including a transistor. An output video signal, representing the separate luminance video signal, is generated by the horizontal synchronization pulse generation circuit. During all periods except the horizontal synchronization period, the output video signal preferably represents the separate luminance video signal less a junction voltage drop across the transistor. During the horizontal synchronization period, a horizontal synchronization pulse is generated and added to the output video signal, by switching a current through a path resistor and applying the voltage drop across the path resistor directly to the output video signal. Accordingly, during the horizontal synchronization period, the output video signal does not represent the separate luminance video signal, but instead includes the horizontal synchronization pulse.

A differential pair of transistors is used to switch the current through the path resistor during the horizontal synchronization period to generate the horizontal synchronization pulse. The differential pair of transistors are controlled by a synchronization input signal which is active during the horizontal synchronization period. The tail current for the differential pair of transistors is generated by a current source including a current resistor. A voltage source is used to provide a predetermined voltage drop across the current resistor. During the horizontal synchronization period, the current generated by the current source flows through the path resistor, generating a voltage drop across the path resistor which is applied to the output voltage signal and pulls the voltage level of the output voltage signal down to generate the horizontal synchronization pulse. Accordingly, during the horizontal synchronization period, the output video signal is equal to the separate luminance video signal less the junction voltage drop across the transistor and the voltage drop across the path resistor. After the horizontal synchronization period, the current generated by the current source does not flow through the path resistor and the output voltage signal is again equal to the separate luminance voltage less the junction voltage drop across the transistor.

The ratio of the path resistor to the current resistor is matched, allowing the required signal accuracy to be achieved in the voltage drop across the path resistor, thereby creating the appropriate voltage drop across the path resistor according to the amount of current flowing through the current resistor. The level of the horizontal synchronization pulse is generated with respect to the level of the output video signal, which represents the separate luminance video signal. The horizontal synchronization pulse generation circuit does not clamp the voltage level of the separate luminance video signal or require precision voltage levels in order to generate the horizontal synchronization pulse. Accordingly, the horizontal synchronization pulse generation circuit of the present invention requires less circuitry and takes up less space than circuits of the prior art.

Figure 2:
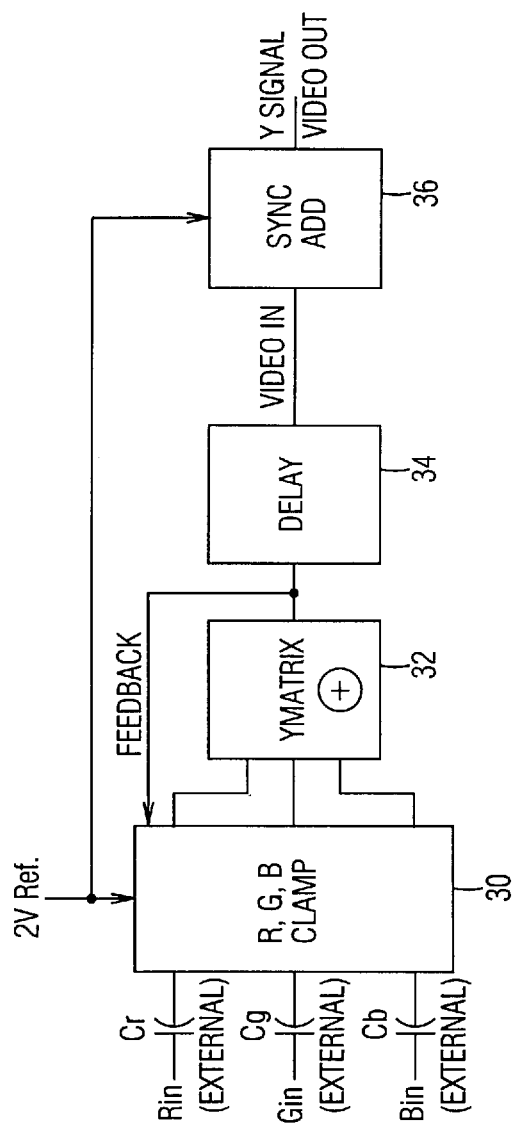
FIG. 2 illustrates a luminance signal generation path according to the present invention including a single clamping circuit and a horizontal synchronization pulse generation circuit.

A luminance signal generation path circuit according to the present invention is illustrated in FIG. 2. The luminance signal generation circuit includes a single clamping circuit 30 and a horizontal synchronization pulse generation circuit 36. The RGB input signals are provided to the single clamping circuit 30. From the single clamping circuit 30, clamped RGB input signals are provided to a Y-matrix circuit 32. Within the Y-matrix circuit 32, the clamped RGB input signals are combined, using equation (1), into a separate luminance signal Y. The separate luminance signal Y is coupled as a feedback signal to the clamping circuit 30 and is also passed through a delay circuit 34 and provided to the horizontal synchronization pulse generation circuit 36 as an encoded input video signal Video In. The delay circuit 34 serves the same purpose and function as the delay circuit 22, discussed above. The horizontal synchronization pulse generation circuit 36 adds a horizontal synchronization pulse to the separate luminance signal Y and provides the resulting signal as the output video signal Video Out. This output signal is then provided as an output of the encoder circuit and to the composite video generation circuit 28. A constant reference voltage signal is provided to both the single clamping circuit 30 and the horizontal synchronization pulse generation circuit 36. Preferably, the constant reference voltage signal has a level equal to two volts.

Figure 3:
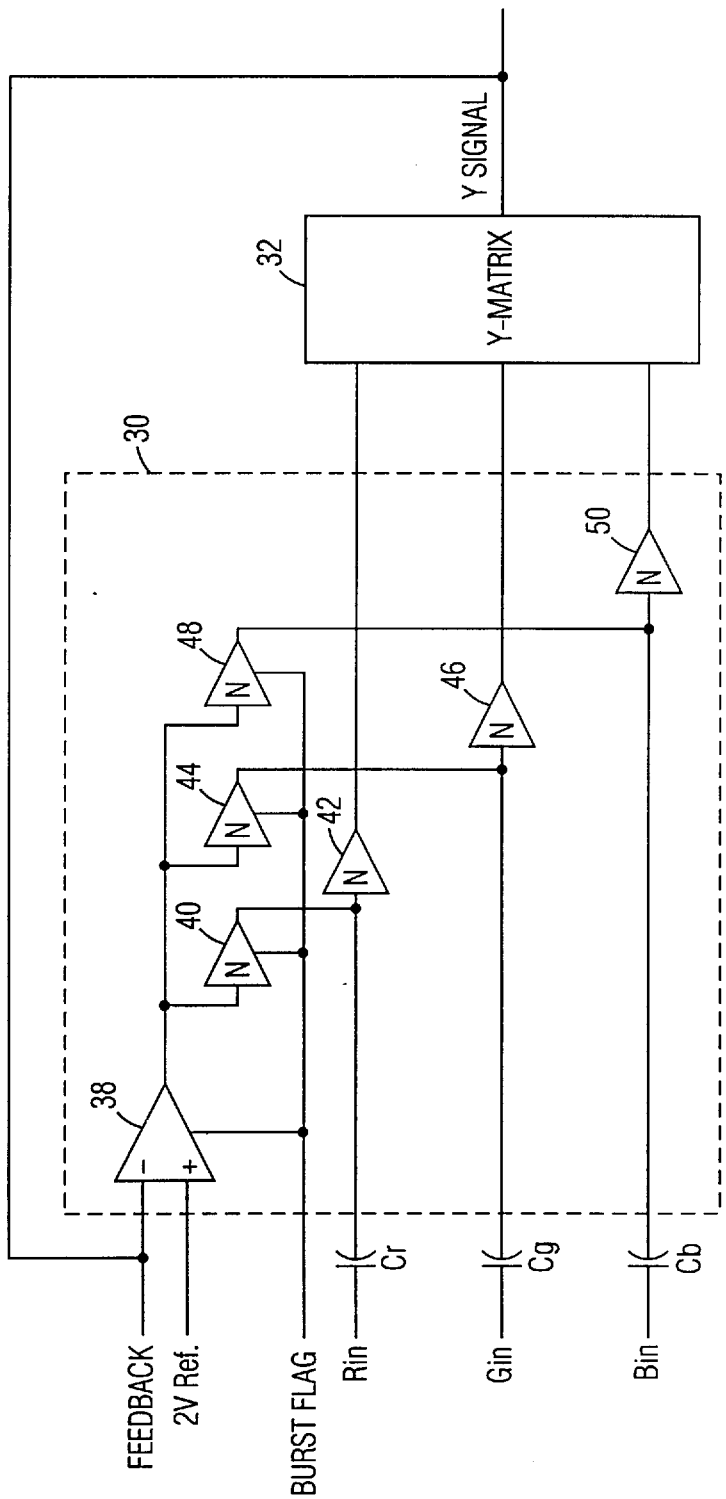
FIG. 3 illustrates a block diagram of a luminance signal generation circuit including a single clamping circuit according to the present invention.

A block diagram of the single clamping circuit 30, according to the present invention, is illustrated in FIG. 3. A red input signal Rin is coupled to a first terminal of a capacitor Cr. A green input signal Gin is coupled to a first terminal of a capacitor Cg. A blue input signal Bin is coupled to a first terminal of a capacitor Cb. Together, the red input signal Rin, the green input signal Gin and the blue input signal Bin form an RGB input signal which is encoded into a separate luminance signal Y by the Y-matrix circuit 32.

A constant voltage reference signal having a value equal to two volts is coupled to a positive input of a differential amplifier 38. An output of the differential amplifier 38 is coupled to inputs of npn transistor follower circuits 40, 44 and 48. An output of the npn transistor follower circuit 40 is coupled to an input of an npn transistor follower circuit 42 and to a second terminal of the capacitor Cr. An output of the npn transistor follower circuit 44 is coupled to an input of an npn transistor follower circuit 46 and to a second terminal of the capacitor Cg. An output of the npn transistor follower circuit 48 is coupled to an input of an npn transistor follower circuit 50 and to a second terminal of the capacitor Cb. Outputs of the npn transistor follower circuits 42, 46 and 50 are coupled as inputs to the Y-matrix circuit 32. An output of the Y-matrix circuit 32 provides the separate luminance signal Y as a weighted combination of the input signals Rin, Gin and Bin, according to the ratios of equation (1). The output of the Y-matrix circuit 32 provides the separate luminance signal Y and is coupled to a negative input of the differential amplifier 38 in a closed-loop feedback configuration. The output of the Y-matrix circuit 32 is also coupled to the delay block 34 and then provided to the horizontal synchronization pulse generation circuit 36, as illustrated in FIG. 2.

A burst flag signal is coupled to enable the differential amplifier 38 and the npn transistor follower circuits 40, 44 and 48. The burst flag signal represents the time period during which a burst signal is present within the video signals. The burst flag signal is active when the burst signal is present within the video signals. When the burst flag signal is active, the differential amplifier 38 and the npn transistor follower circuits 40, 44 and 48 are enabled. Correspondingly, when the burst flag signal is inactive, the differential amplifier 38 and the npn transistor follower circuits 40, 44 and 48 are disabled.

When the burst flag signal is active, the differential amplifier 38 compares the separate luminance signal Y, provided from the Y-matrix circuit 32, to the constant voltage reference signal. A signal representing the difference between the separate luminance signal Y and the constant voltage reference signal is provided from the differential amplifier 38 to the inputs of the npn transistor follower circuits 40, 44 and 48. The npn transistor follower circuits 40, 44 and 48 pass the differential output signal from the differential amplifier 38 to the inputs of the npn transistor follower circuits 42, 46 and 50, when the burst flag signal is active. The npn transistor follower circuits 42, 46 and 50 are implemented as buffer circuits and pass through the signals at their inputs to the Y-matrix circuit 32.

The Y-matrix circuit 32 multiplies each of the signals provided from the npn transistor follower circuits 42, 46 and 50 by an appropriate weighting factor, according to the equation (1), and provides the resulting separate luminance signal Y from its output. During the period when the burst flag signal is active, the clamping circuit is only satisfied when the separate luminance signal Y is equal to the constant reference voltage signal. Therefore, when the burst flag signal is active, the following equation applies:

$$0.30*Rin + 0.59*Gin + 0.11*Bin = 2.0 \text{ V} \qquad (2)$$

During the time period when the burst flag signal is active, the output of the differential amplifier 38 is provided to be combined with each of the input signals Rin, Gin and Bin. Accordingly, each of the input signals Rin, Gin and Bin are forced to the same voltage level, such that:

$$0.30*Rin + 0.59*Rin + 0.11*Rin = 2.0 \text{ V} \qquad (3)$$

$$1*Rin = 2.0 \text{ V} \qquad (4)$$

$$Rin = Gin = Bin = 2.0 \text{ V} \qquad (5)$$

Therefore, the single clamping circuit of the present invention, using the separate luminance signal Y as a feedback signal, forces the blanking level of the input signals Rin, Gin and Bin and the separate luminance signal Y to the known value equal to the constant reference voltage level, during the burst period. In the preferred embodiment, this level is equal to two volts. Once the blank levels of the input signals Rin, Gin and Bin and the separate luminance signal Y are clamped to this known level, during the burst period, the blank levels will remain at that known level throughout the non-burst period of the separate luminance signal Y.

During the time period when the burst flag signal is active, the differential amplifier 38 and the npn transistor followers 40, 44 and 48 are enabled. The differential amplifier 38 compares the separate luminance signal Y, received from the Y-matrix circuit 32, to the constant reference voltage signal and provides the difference signal representing the difference between the value of the separate luminance signal Y and the constant reference voltage signal. This difference signal is then provided through the npn transistor followers 40, 44 and 48 to the second terminal of the capacitors Cr, Cg and Cb, respectively. The voltage level across the capacitors Cr, Cg and Cb is then either increased or decreased according to the level of the output signal from the differential amplifier 38, in order to adjust the level of the voltage stored across the capacitors Cr, Cg and Cb to equal the constant reference voltage signal. The voltages stored across the capacitors Cr, Cg and Cb are passed through the npn transistor followers 42, 46 and 50 and provided to the Y-matrix circuit 32. The Y-matrix circuit 32 then combines these voltages, weighted according to the equation (1), and provides the separate luminance signal Y. During the burst period, the separate luminance signal Y is continuously compared to the constant reference voltage signal and the difference is used to adjust the blank levels of the input signals Rin, Gin and Bin, as needed, in order to ensure that the blank level of the separate luminance signal Y is equal to the constant reference voltage signal.

During the non-burst periods, when the burst flag signal is inactive, the differential amplifier 38 and the npn transistor followers 40, 44 and 48 are disabled. During this time period, the input signals Rin, Gin and Bin are passed through the npn transistor followers 42, 46 and 50 and provided to the Y-matrix circuit 32. The Y-matrix circuit 32 then combines the input signals Rin, Gin and Bin, weighted according to the equation (1), and provides the resulting separate luminance signal Y. After being clamped during the burst periods, the blank level of the separate luminance signal Y will remain at the known level of the constant reference voltage signal during the non-burst period.

The luminance signal generation circuit of the present invention uses only a single clamping circuit to clamp the blank level of the separate luminance signal Y and the input signals Rin, Gin and Bin to a constant reference voltage level. The components of the signals can then be readily determined from the differences between their amplitude and the constant reference voltage level. Accordingly, the separate luminance signal Y will accurately reflect the values of the input signals Rin, Gin and Bin, even though they are brought in from an outside system. The number of external components and pins required by the luminance signal generation circuit with single clamp according to the present invention is therefore substantially reduced compared to the four clamping circuits required by the prior art circuit illustrated in FIG. 1. No pnp transistors are required within the luminance signal generation circuit and single clamping circuit. Only high speed npn transistor follower circuits are used within the preferred embodiment. The separate luminance signal Y is also used as a feedback signal from which the level of adjustments made to the blank levels of the input signals Rin, Gin and Bin is derived.

Figure 4:
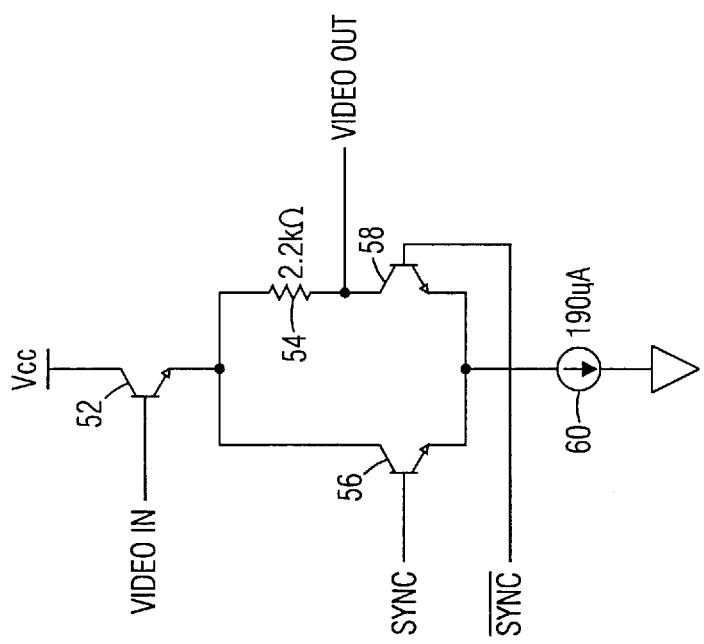
FIG. 4 illustrates a schematic diagram of a horizontal synchronization pulse generation circuit of the present invention.

A schematic diagram of the horizontal synchronization pulse generation circuit 36, according to the present invention, is illustrated in FIG. 4. The encoded separate luminance signal Y is provided to the horizontal synchronization pulse generation circuit 36 as the video input signal Video In and is coupled to a base of an npn transistor 52. A collector of the transistor 52 is coupled to a supply voltage VCC. A synchronization input signal Sync is coupled to a base of an npn transistor 56. The synchronization input signal Sync is preferably at a low voltage level during the horizontal synchronization period and at a high voltage level during the remaining periods of the encoded input video signal Video In. A synchronization input signal $\overline{Sync}$ is coupled to a base of an npn transistor 58. The synchronization input signal $\overline{Sync}$ is always at an opposite level to the level of the synchronization input signal Sync. Accordingly, the synchronization input signal $\overline{Sync}$ is preferably at a high voltage level during the horizontal synchronization period and at a low voltage level during the remaining periods of the encoded video input signal Video In. The synchronization input signals Sync and $\overline{Sync}$ are generated by timing circuitry, by any appropriate conventional method.

An emitter of the transistor 52 is coupled to a collector of the transistor 56 and to a first terminal of a path resistor 54. A second terminal of the path resistor 54 is coupled to a collector of the transistor 58, thereby forming an output node from which the output signal Video Out, including a representation of the video input signal Video In and a horizontal synchronization pulse, is provided. An emitter of the transistor 56 is coupled to an emitter of the transistor 58 and to a first terminal of a current source 60. A second terminal of the current source 60 is coupled to ground. Preferably, the current source 60 sinks a current of 190 microamps and the path resistor 54 has a value of 2200 ohms.

Together, the transistors 56 and 58 form a differential pair. Accordingly, current is drawn through a selective one of the transistors 56 and 58 based on the values of the synchronization input signals Sync and $\overline{Sync}$ applied to the bases of the transistors 56 and 58, respectively. The output signal Video Out follows the encoded input video signal Video In in all portions of a horizontal period of the video signal except the horizontal synchronization portion. During the horizontal synchronization portion, a horizontal synchronization pulse is added to the output signal Video Out.

Figure 6:
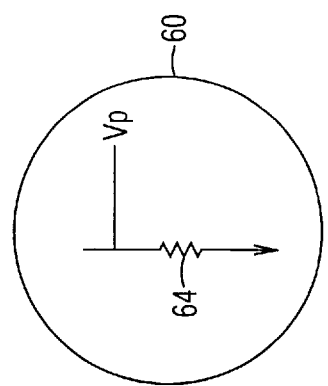
FIG. 6 illustrates a schematic diagram of the current source used within the horizontal synchronization pulse generation circuit of the present invention.

The current source 60 is generated from a voltage source Vp coupled through a resistor 64 as illustrated in FIG. 6. The voltage source Vp, has a predetermined voltage level and is coupled to a first terminal of the resistor 64, which is ultimately coupled to the emitters of the transistors 56 and 58, within the circuit of FIG. 4. A second terminal of the resistor 64 is ultimately coupled to ground within the circuit of FIG. 4. Accordingly, the difference between the voltage source Vp and ground, generates a voltage drop across the current resistor 64. This voltage drop across the current resistor 64 generates the current for the current source 60. The voltage source Vp is not required to be at a specific level and can therefore be taken from a voltage source used somewhere else within the system which includes the horizontal synchronization pulse circuit of the present invention. In the preferred embodiment of the present invention, the voltage source Vp is equal to two volts and is taken from the same voltage source which provides the constant reference voltage signal for the clamping circuit 30. What must be precise is the amount of current generated by the current source 60 and the ratio of the current resistor 64 to the path resistor 54. Accordingly, as will be apparent to those skilled in the art, the value of the voltage source Vp and the value of the resistor 64 must correspond in order to generate the appropriate current level for the current source 60. Preferably, the current source 60 sinks a current equal to 190 microamps. The ratio of the current resistor 64 to the path resistor 54 is matched within the circuit in order to generate the appropriate voltage drop across the path resistor 54 during the horizontal synchronization period.

The current flowing through the current source 60 is switched on and off through the path resistor 54 to generate the required voltage drop necessary to create the horizontal synchronization pulse within the output video signal Video Out. The output node, which provides the output signal Video Out, preferably drives an amplifier input of sufficiently high impedance such that there is minimal current flow through the resistor 54 during the non-horizontal synchronization periods. However, since the same current flows through the load whether or not the horizontal synchronization pulse is applied to the output signal Video Out, the synchronization pulse levels are not affected by the current during the non-horizontal synchronization periods. The accuracy of the levels of the output signal Video Out, depends on the accuracy of the ratios of the resistors 54 and 64 and the current that is provided through the resistors 54 and 64. Because device matching is very reliable within an integrated circuit, the horizontal synchronization generation circuit of the present invention provides the necessary levels and the required signal accuracy with very little circuitry.

In all periods other than the horizontal synchronizing period, the current of the differential pair flows through the transistor 56. As discussed above, there is none or negligible current flowing through the path resistor 54 during all periods other than the horizontal synchronization period. Accordingly, during periods other than the horizontal synchronization period, the voltage level of the output signal Video Out, provided from the output node, is a base-to-emitter junction voltage drop below the encoded input video signal Video In.

Figure 5:
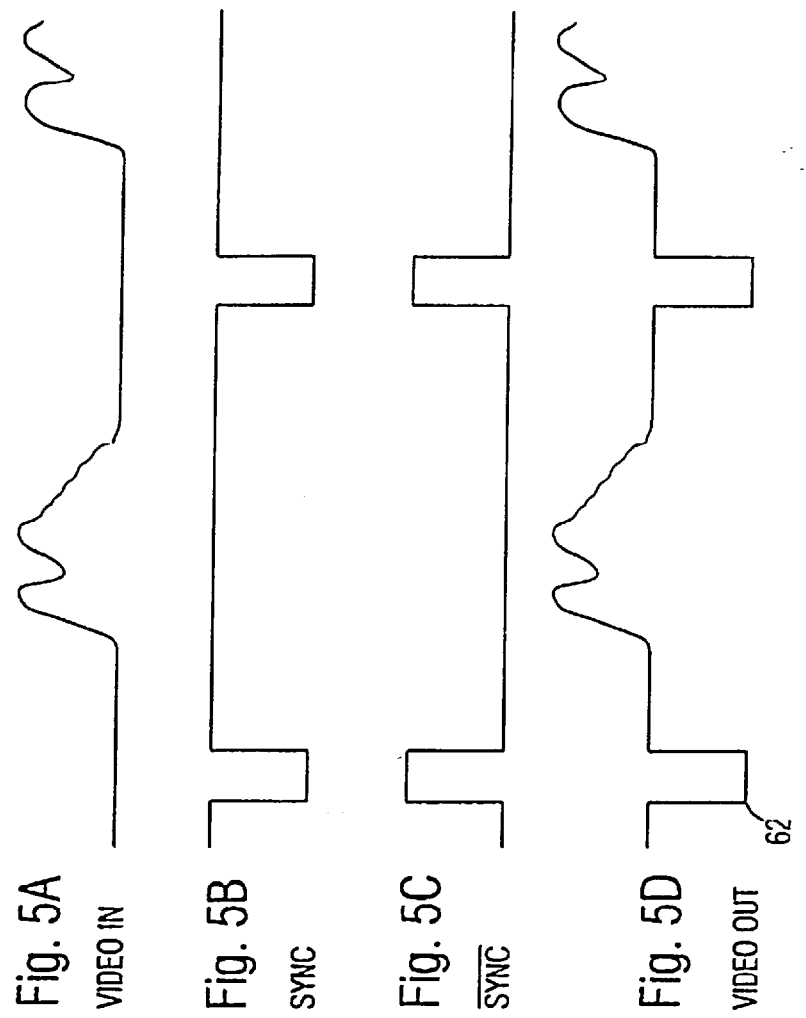

In operation, the horizontal synchronization pulse generation circuit illustrated in FIG. 4 generates the output video signal Video Out which is representative of the encoded input video signal Video In in all periods of the signal except the horizontal synchronization period. During the horizontal synchronization period, the output video signal Video Out includes a horizontal synchronization pulse. Timing diagrams showing the generated output video signal Video Out and relevant points within the horizontal synchronization generation circuit of FIG. 4 are illustrated in FIG. 5. A waveform representing the encoded input video signal Video In is illustrated in FIG. 5A. As discussed above, the encoded input video signal Video In is the separate luminance signal Y provided from the Y-matrix circuit 32. A waveform representing the synchronization input signal Sync is illustrated in FIG. 5B. A waveform representing the synchronization input signal $\overline{Sync}$ is illustrated in FIG. 5C. A waveform representing the output video signal Video Out is illustrated in FIG. 5D.

During a horizontal synchronization period, the synchronization input signal Sync is at a low voltage level and the synchronization input signal $\overline{Sync}$ is at a high voltage level. At all other periods within the encoded input video signal Video In, the synchronization input signal Sync is at a high voltage level and the synchronization input signal $\overline{Sync}$ is at a low voltage level. At the beginning of a horizontal synchronization period, the synchronization input signal Sync falls to a low voltage level, the synchronization input signal $\overline{Sync}$ rises to a high voltage level and the current generated by the current source 60 flows through the path resistor 54 and the transistor 58. The encoded video input signal Video In less a base-toemitter junction voltage drop across the transistor 52 is provided to the first terminal of the resistor 54. The voltage drop across the path resistor 54 due to the current is then applied to this signal and creates a drop within the output video signal Video Out to the horizontal synchronization pulse level 62. This voltage drop is accordingly taken in reference to the encoded video input signal Video In and therefore no clamping circuits are required by the horizontal synchronization pulse generation circuit 36 of the present invention.

At the end of a horizontal synchronization period, the synchronization input signal Sync rises to a high voltage level, the synchronization input signal $\overline{Sync}$ falls to a low voltage level and the current generated by the current source 60 flows through the transistor 56. Because there is negligible or no current flowing through the path resistor 54, the output video signal Video Out follows the encoded video input signal Video In and is equal to a base-to-emitter junction voltage drop below the voltage level of the encoded video signal Video In. The output video signal Video Out follows the encoded video input signal Video In in this manner until the next horizontal synchronization period, when the synchronizing input signal Sync falls to a low voltage level and the synchronizing input signal $\overline{Sync}$ rises to a high voltage level.

Figure 7:
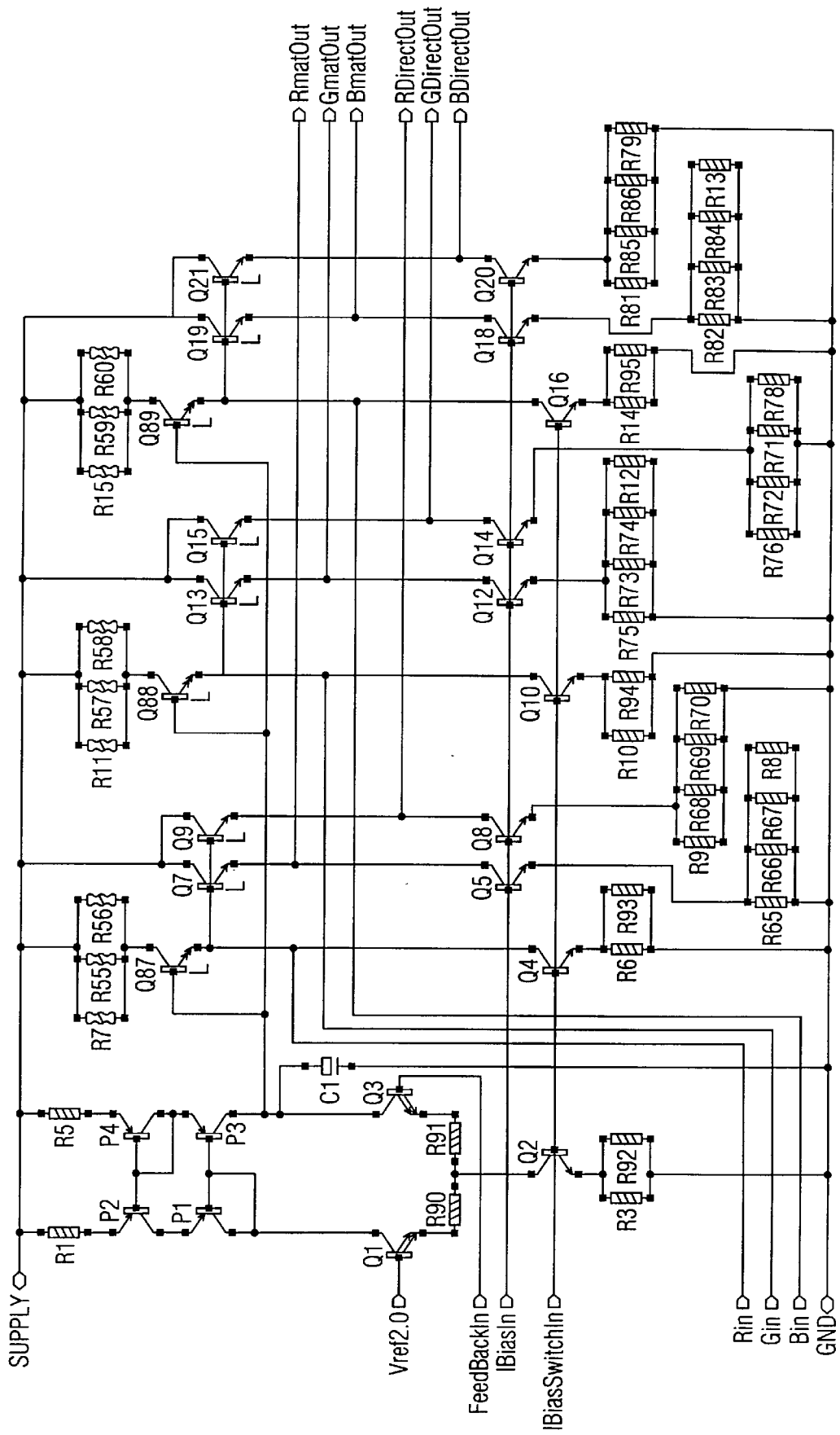
FIG. 7 illustrates a detailed schematic diagram of the single clamping circuit according to the present invention.
Figure 8:
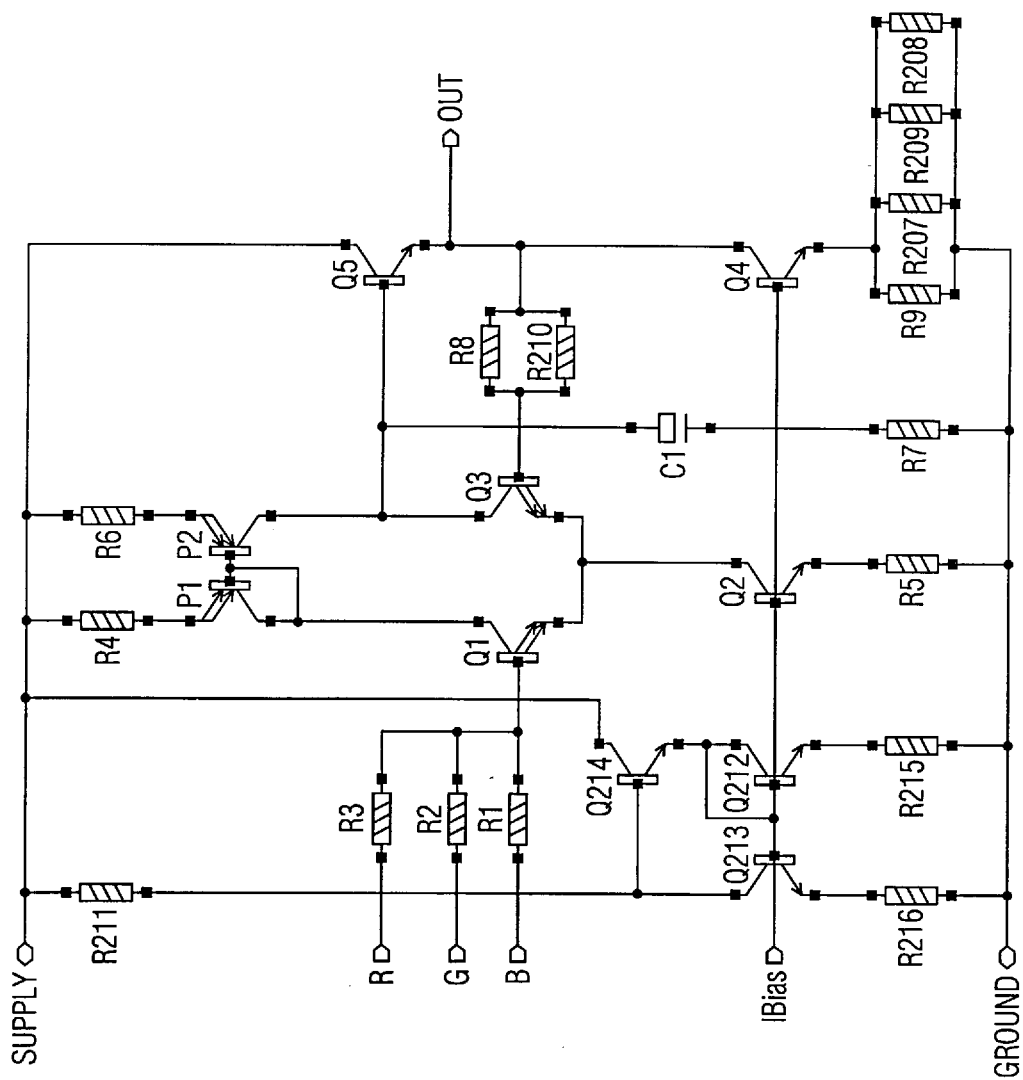
FIG. 8 illustrates a detailed schematic diagram of the Y-matrix circuit.
Figure 9A:
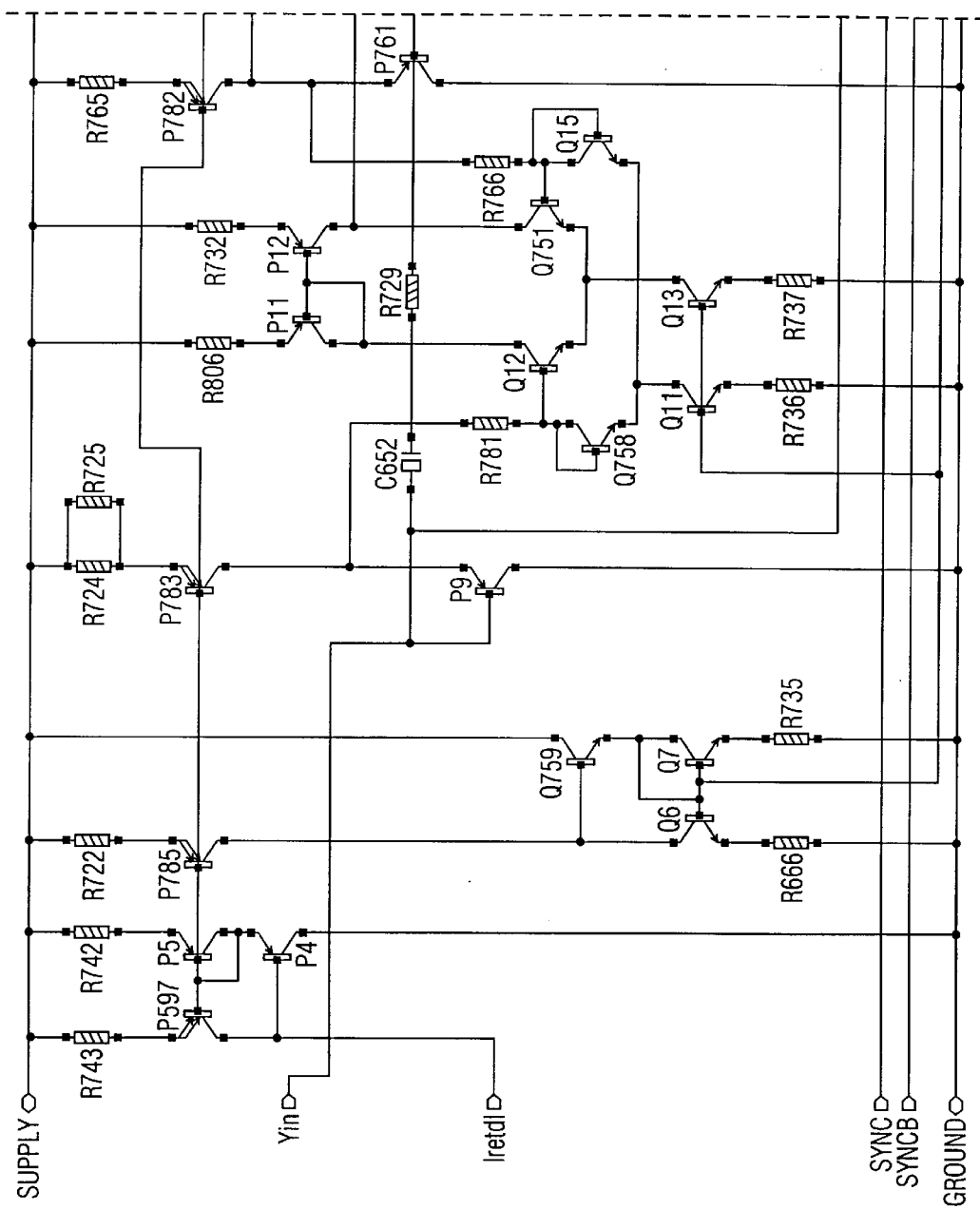
FIG. 9 illustrates a detailed schematic diagram of the delay circuit.
Figure 9B:
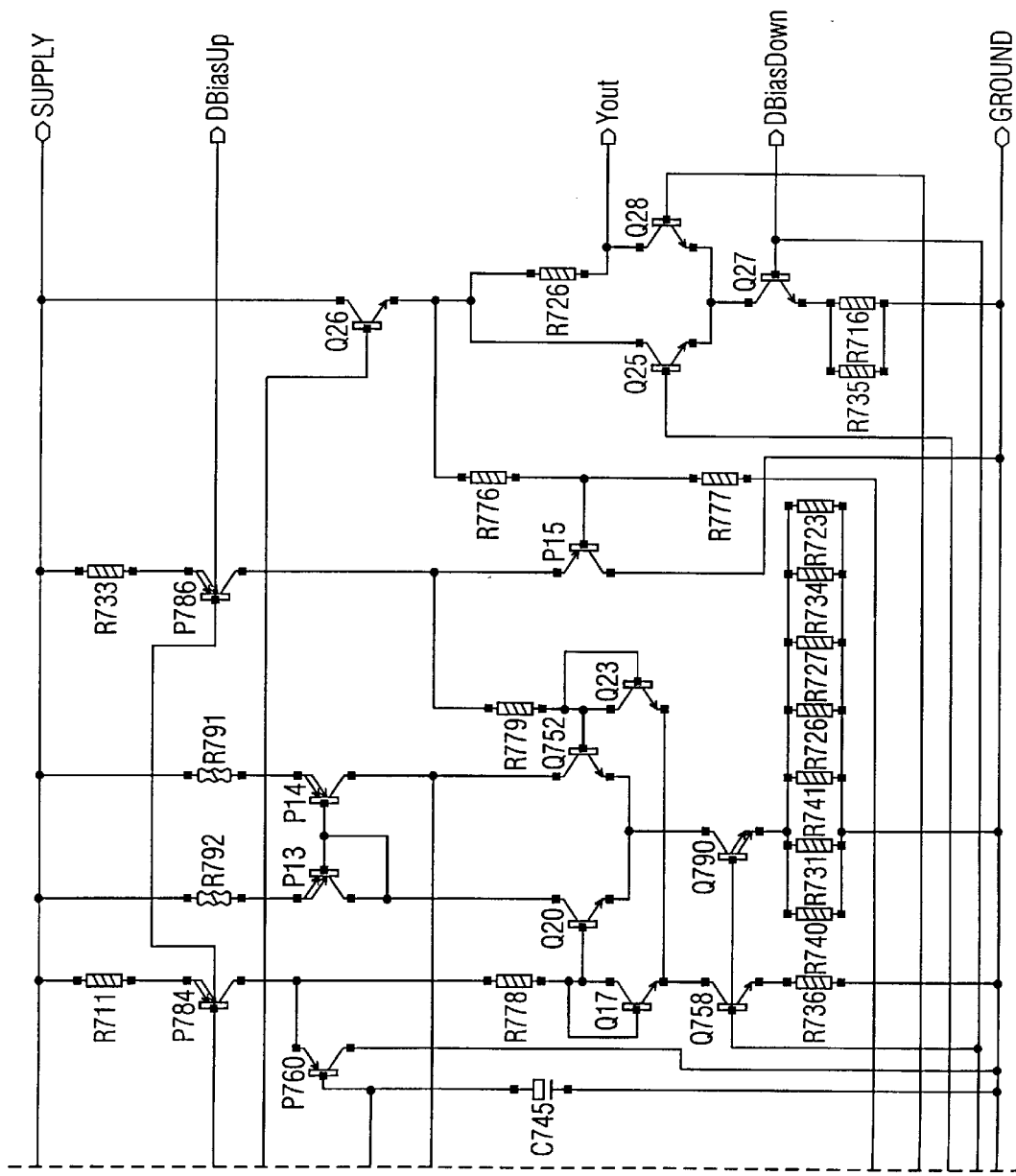
Figure 10:
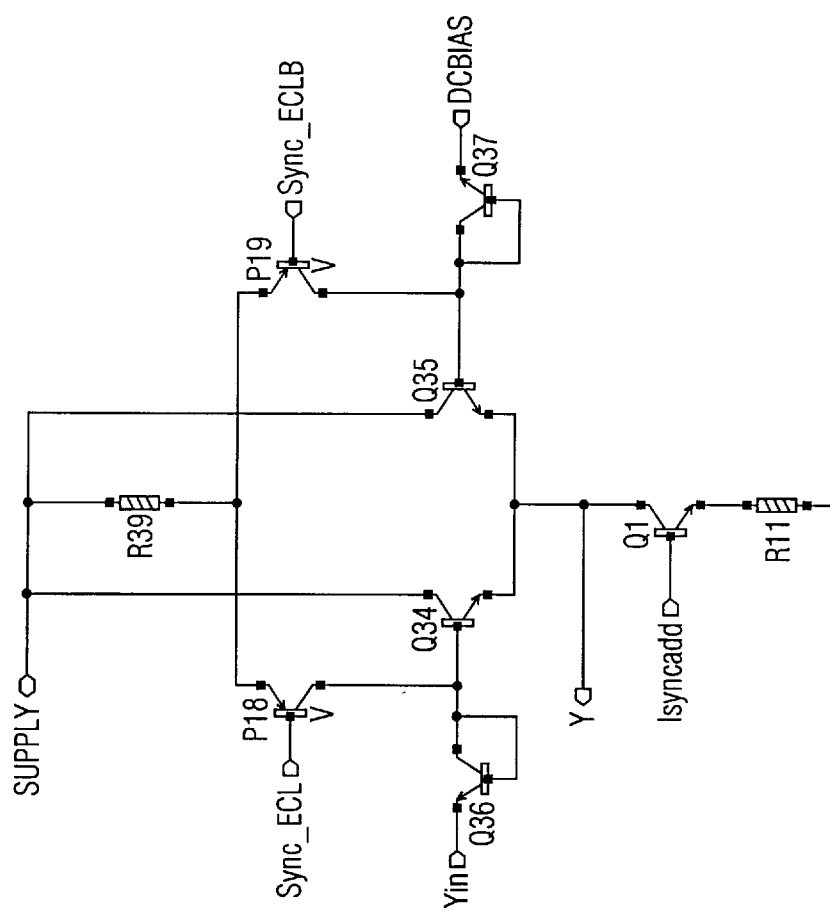
FIG. 10 illustrates a detailed schematic diagram of the horizontal synchronization pulse generation circuit of the present invention.

A detailed circuit schematic of the preferred embodiment of the clamping circuit portion of the luminance signal generation circuit of the present invention is illustrated in FIG. 7. A detailed circuit schematic of the preferred embodiment of the Y-matrix circuit is illustrated in FIG. 8. A detailed circuit schematic of the preferred embodiment of the delay circuit is illustrated in FIG. 9. A detailed circuit schematic of the preferred embodiment of the horizontal synchronization pulse generation circuit 36 of the present invention is illustrated in FIG. 10. The preferred embodiment of the present invention is implemented within an analog video encoder integrated circuit, Part No. CXA2075, which will be available from Sony Corporation of America, 3300 Zanker Road, San Jose, Calif. 95134 .

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A luminance signal generation apparatus for generating a luminance signal representing RGB input signals and including a horizontal synchronization pulse, comprising:

a. a plurality of input receiving circuits configured to receive RGB input signals;

b. a combining circuit coupled to the plurality of input receiving circuits for providing a luminance signal representing the RGB input signals, wherein the RGB input signals and the luminance signal all have a blanking level;

c. a clamping circuit coupled to the combining circuit to receive the luminance signal and to the plurality of input receiving circuits for adjusting the blanking level of the RGB input signals according to a blanking level of the luminance signal; and d. a horizontal synchronization pulse generation circuit coupled to the combining circuit for generating a horizontal synchronization pulse during a horizontal synchronization period and adding the horizontal pulse to the luminance signal.

2. The luminance signal generation apparatus as claimed in claim 1 wherein the clamping circuit is enabled only during a burst period.

3. The luminance signal generation apparatus as claimed in claim 2 wherein the clamping circuit is further coupled to receive a burst flag signal representing the burst period.

4. The luminance signal generation apparatus as claimed in claim 2 wherein the clamping circuit further comprises a differential amplifier coupled to receive the luminance signal and to receive a constant reference voltage signal for comparing the luminance signal to the constant reference voltage signal and providing a difference signal representing a difference between the luminance signal and the constant reference voltage signal.

5. The luminance signal generation apparatus as claimed in claim 4 wherein the difference signal is provided to the plurality of input receiving circuits for adjusting the blanking level of the RGB input signals.

6. The luminance signal generation apparatus as claimed in claim 5 wherein the horizontal synchronization pulse generation circuit further comprises:
 a. a horizontal input receiving circuit configured for receiving the luminance signal;
 b. an output node for providing an output signal representing the luminance signal;
 c. a path resistor coupled between the horizontal input receiving circuit and the output node;
 d. a current generation circuit coupled to the path resistor for generating a current to flow through the path resistor; and
 e. a switching circuit coupled between the path resistor and the current generation circuit for allowing the current to flow through the path resistor only during the horizontal synchronization period, thereby creating a horizontal synchronization pulse which is applied directly to the output signal.

7. The luminance signal generation apparatus as claimed in claim 6 wherein the input receiving circuit includes a first transistor.

8. The luminance signal generation apparatus as claimed in claim 7 wherein the output signal is equal to the luminance signal less a junction voltage drop across the first transistor during all periods except the horizontal synchronization period.

9. The luminance signal generation apparatus as claimed in claim 8 wherein the output signal is equal to the luminance signal less a junction voltage drop across the first transistor and a first voltage drop across the path resistor due to the current during the horizontal synchronization period.

10. The luminance signal generation apparatus as claimed in claim 9 wherein the switching circuit includes a differential pair of transistors controlled by a synchronization input signal, wherein the synchronization input signal is active during the horizontal synchronization period.

11. The luminance signal generation apparatus as claimed in claim 6 wherein the current generation circuit includes a current resistor and a voltage level coupled to the current resistor for creating a second voltage drop across the current resistor and thereby generating the current.

12. The luminance signal generation apparatus as claimed in claim 11 wherein the constant reference voltage signal and the voltage level both equal two volts.

13. The luminance signal generation apparatus as claimed in claim 12 wherein the apparatus is implemented within an integrated circuit and includes only components internal to the integrated circuit.

14. A video encoder for encoding a video signal representing one or more input video signals and including a horizontal synchronizing pulse within an encoded video signal comprising:
 a. a video encoding circuit configured for receiving one or more input video signals and generating an encoded video signal representing video information within the input video signals;
 b. a clamping circuit coupled to the video encoding circuit for clamping a blanking level of the encoded video signal and providing a clamped video signal;
 c. an output node for providing an output signal representing the clamped video signal;
 d. a path resistor coupled between the video encoding circuit and the output node;
 e. a current generation circuit coupled to the path resistor for generating a current to flow through the path resistor; and
 f. a switching circuit coupled between the path resistor and the current generation circuit for allowing the current to flow through the path resistor only during a horizontal synchronization period, thereby creating a horizontal synchronization pulse which is applied directly to the output signal by effecting a first voltage drop across the path resistor.

15. The video encoder as claimed in claim 14 further comprising a first transistor coupled between the video encoding circuit and the path resistor for providing the encoded video signal to the path resistor.

16. The video encoder as claimed in claim 15 wherein the output signal is equal to the clamped video signal less a junction voltage drop across the first transistor during all periods except the horizontal synchronization period.

17. The video encoder as claimed in claim 16 wherein the output signal is equal to the clamped video signal less a junction voltage drop across the first transistor and the first voltage drop across the path resistor during the horizontal synchronization period.

18. The video encoder as claimed in claim 17 wherein the switching circuit includes a differential pair of transistors controlled by a synchronization input signal, and further wherein the synchronization input signal is active during the horizontal synchronization period.

19. The video encoder as claimed in claim 18 wherein the current generation circuit includes a current resistor and a voltage level coupled to the current resistor for creating a second voltage drop across the current resistor and thereby generating the current.

20. The video encoder as claimed in claim 19 wherein the clamping circuit further comprises:
 a. an amplifying circuit configured to receive the encoded video signal generated from the one or more input signals and a constant reference voltage signal for comparing the encoded video signal to the constant reference voltage signal and providing a difference signal representing a difference between the encoded video signal and the constant reference voltage signal; and
 b. a plurality of input adjusting circuits, each coupled to the amplifying circuit and to a respective input signal for using the difference signal to adjust a blanking level of the input signals.

21. The video encoder as claimed in claim 20 wherein the input signals are RGB signals.

22. The video encoder as claimed in claim 21 wherein the encoded video signal is a luminance signal.

23. The clamping circuit as claimed in claim 22 wherein the amplifying circuit and the plurality of input adjusting circuits are enabled only during a burst period.

24. The clamping circuit as claimed in claim 23 wherein the amplifying circuit includes a differential amplifier for providing the difference signal.

25. The clamping circuit as claimed in claim 24 wherein the constant reference voltage signal has a level equal to two volts.

26. The clamping circuit as claimed in claim 25 wherein the circuit is implemented within an integrated circuit and includes only components internal to the integrated circuit.

27. A video encoder circuit for encoding a video signal representing one or more input video signals and including a horizontal synchronization pulse within an encoded video signal comprising:
 a. a plurality of input receiving circuits configured to receive RGB input signals;
 b. a combining circuit coupled to the plurality of input receiving circuits for providing an encoded luminance signal representing the RGB input signals, wherein the RGB input signals and the luminance signal all have a blanking level;

c. a clamping circuit for clamping the blanking level of the luminance signal and providing a clamped luminance signal including:
   i. an amplifying circuit configured to receive the luminance signal and a constant reference voltage signal for comparing the luminance signal to the constant reference voltage signal and providing a difference signal representing a difference between the luminance signal and the constant reference voltage signal; and
   ii. a plurality of input adjusting circuits, each coupled to the amplifying circuit and to the plurality of input receiving circuits for adjusting the blanking level of the RGB signals according to the difference signal;

d. an input transistor configured for receiving the clamped luminance signal;

e. an output node for providing an output signal representing the clamped luminance signal less a junction voltage drop across the input transistor, during all periods except a horizontal synchronization period;

f. a path resistor coupled between the input transistor and the output node;

g. a current source coupled to the path resistor for generating a current to flow through the path resistor; and h. a differential pair of transistors coupled between the path resistor and the current generation circuit for switching the current generated by the current source through the path resistor in order that the current flows through the path resistor only during the horizontal synchronization period, thereby creating a horizontal synchronization pulse which is applied directly to the output signal, and further wherein the output signal is equal to the clamped luminance signal less the junction voltage drop and a first voltage drop across the path resistor during the horizontal synchronization period.

28. The video encoder circuit as claimed in claim 27 wherein the clamping circuit is enabled only during a burst period.

29. The video encoder circuit as claimed in claim 28 wherein the clamping circuit is further coupled to receive a burst flag signal representing the burst period and further wherein the clamping circuit is enabled only when the burst flag signal is active.

30. The video encoder circuit as claimed in claim 29 wherein the amplifying circuit includes a differential amplifier for providing the difference signal.

31. The video encoder circuit as claimed in claim 30 wherein the current source includes a current resistor and a voltage level coupled to the current resistor for creating a second voltage drop across the current resistor and thereby generating the current.

32. The video encoder circuit as claimed in claim 31 wherein the differential pair is controlled by a synchronization input signal which is active during the horizontal synchronization period.

33. The video encoder circuit as claimed in claim 32 wherein the constant reference voltage signal and the voltage level both equal two volts.

34. A video encoder for encoding a video signal representing one or more input video signals and including a horizontal synchronizing pulse within an encoded video signal comprising:

a. a video encoding circuit configured for receiving one or more input video signals and generating an encoded video signal representing video information within the input video signals;

b. a clamping circuit coupled to the video encoding circuit for clamping a blanking level of the encoded video signal and providing, a clamped video signal;

c. an output node for providing an output signal representing the clamped video signal;

d. a path resistor coupled between the video encoding Circuit and the output node; and e. a switching circuit coupled to the path resistor for allowing a current to flow through the path resistor only during a horizontal synchronization period, thereby generating a horizontal synchronization pulse which is applied directly to the output signal by effecting a first voltage drop across the path resistor.

35. A video encoder for encoding a video signal representing one or more input video signals and including a horizontal synchronizing pulse within an encoded video signal comprising:

a. a video encoding circuit configured for receiving one or more input video signals and generating an encoded video signal representing video information within the input video signals;

b. a path resistor coupled to the video encoding circuit;

c. a current generation circuit coupled to the path resistor for generating a current to flow through the path resistor; and d. a switching circuit coupled between the path resistor and the current generation circuit for allowing the current to flow through the path resistor only during a horizontal synchronization period. thereby generating a horizontal synchronization pulse which is applied directly to the encoded video signal by effecting a first voltage drop across the path resistor.

36. A luminance signal generation apparatus for generating a luminance signal representing RGB input signals and including a horizontal synchronization pulse, comprising:

a. a plurality of input receiving circuits configured to receive RGB input signals;

b. a combining circuit coupled to the plurality of input receiving, circuits for providing a luminance signal representing the RGB input signals, wherein the RGB input signals and the luminance signal all have a blanking level;

c. a path resistor coupled to the combining circuit; and d. a horizontal synchronization pulse generation circuit coupled between the path resistor and the combining circuit for allowing a current to now through the path resistor only during a horizontal synchronization period, thereby generating a horizontal synchronization pulse which is applied directly to the luminance signal by effecting a first voltage drop across the path resistor.

* * * * *

UNITED STATES PATENT AND TRADEMARK OFFICE
CERTIFICATE OF CORRECTION

PATENT NO. : 5,864,371

DATED : January 26, 1999

INVENTOR(S) : Mehrdad Nayebi et al.

It is certified that error appears in the above-identified patent and that said Letters Patent is hereby corrected as shown below:

Column 11, line 41, delete "base-toemitter" and insert --base-to-emitter--.

Column 12, lines 10 and 11, delete "Part No. CXA2075 , which" and insert --Part No. CXA2075, which--.

IN THE CLAIMS

Column 16, line 16, delete "Circuit" and insert --circuit--.

Column 16, line 57, delete "current to now through" and insert --current to flow through--.

Signed and Sealed this

Thirteenth Day of July, 1999

Attest:

Attesting Officer

Q. TODD DICKINSON

Acting Commissioner of Patents and Trademarks